US010379261B2

(12) United States Patent
Chance

(10) Patent No.: US 10,379,261 B2
(45) Date of Patent: Aug. 13, 2019

(54) STANCHION MOUNTABLE RAIN GAUGE ASSEMBLY

(71) Applicant: Royce Chance, Slaton, TX (US)

(72) Inventor: Royce Chance, Slaton, TX (US)

(*) Notice: Subject to any disclaimer, the term of this patent is extended or adjusted under 35 U.S.C. 154(b) by 142 days.

(21) Appl. No.: 15/609,698

(22) Filed: May 31, 2017

(65) Prior Publication Data
US 2018/0348403 A1 Dec. 6, 2018

(51) Int. Cl.
*G01W 1/14* (2006.01)

(52) U.S. Cl.
CPC ..................... *G01W 1/14* (2013.01)

(58) Field of Classification Search
CPC ........... G01W 1/14; G01W 1/00; G01W 1/08; G01W 1/02; G01W 1/10; G01W 1/04; G01W 1/06; G01W 1/12; G01W 1/16; G01W 2001/003; G01W 2001/006; G01W 2203/00; B60S 1/0822; B60S 1/0825; B60S 1/0818; B60S 1/0888; B60S 1/0866; B60S 1/087; B60S 1/0833; B60S 1/0837; B60S 1/0859; B60S 1/0881; B60S 1/0892
USPC .......................................... 73/170.16–170.28
See application file for complete search history.

(56) References Cited

U.S. PATENT DOCUMENTS

| D157,804 S | 3/1950 | Vernon |
| 2,509,522 A | 5/1950 | Phillips |
| 2,907,206 A | 10/1959 | O'Neil |
| 3,432,656 A * | 3/1969 | Smith .................. G01N 23/12 |
| | | 250/363.01 |
| D316,981 S | 5/1991 | Geschwender |
| 5,038,606 A | 8/1991 | Geschwender |
| 6,494,089 B1 | 12/2002 | Geschwender |
| 7,066,021 B1 * | 6/2006 | Noe ...................... G01W 1/14 |
| | | 222/420 |
| D525,549 S | 7/2006 | Crewz |
| 7,377,473 B2 | 5/2008 | Waldner |
| 7,543,493 B2 | 6/2009 | Geschwender |
| 9,010,182 B1 | 4/2015 | Glenn |
| 2006/0191333 A1 * | 8/2006 | Noe ...................... G01W 1/14 |
| | | 73/170.17 |
| 2014/0000725 A1 * | 1/2014 | Carrio .................. G01W 1/14 |
| | | 137/132 |

* cited by examiner

*Primary Examiner* — Andre J Allen

(57) ABSTRACT

A rain gauge assembly for facilitating a rain gauge to be removably coupled to a stanchion includes a cap that is selectively positioned on a stanchion. A first container is removably coupled to the cap to capture rain for measuring rain fall. A second container is removably coupled to the cap to capture rain for measuring rain fall. A tube is selectively and fluidly coupled between the first and second containers. The tube directs the rain from the first container into the second container when the first container is filled.

14 Claims, 5 Drawing Sheets

STANCHION MOUNTABLE RAIN GAUGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to gauge devices and more particularly pertains to a new gauge device for facilitating a rain gauge to be removably coupled to a stanchion.

BRIEF SUMMARY OF THE INVENTION

An embodiment of the disclosure meets the needs presented above by generally comprising a cap that is selectively positioned on a stanchion. A first container is removably coupled to the cap to capture rain for measuring rain fall. A second container is removably coupled to the cap to capture rain for measuring rain fall. A tube is selectively and fluidly coupled between the first and second containers. The tube directs the rain from the first container into the second container when the first container is filled.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
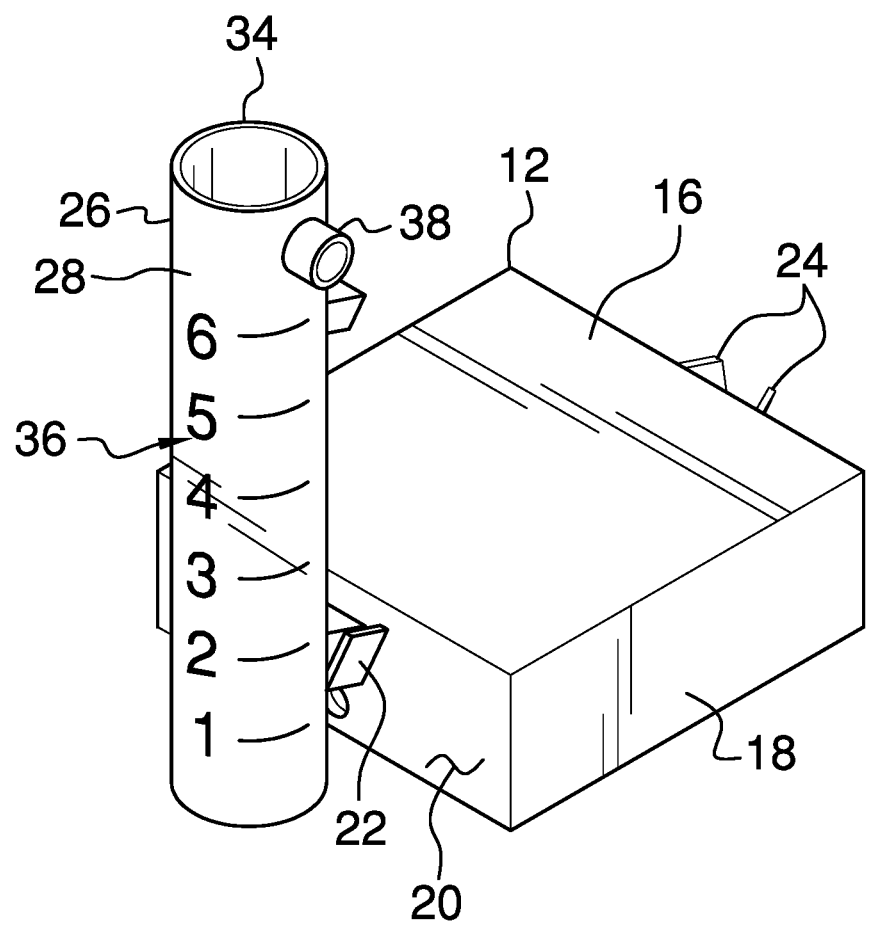
FIG. 1 is a perspective view of a rain gauge assembly according to an embodiment of the disclosure.
Figure 2:
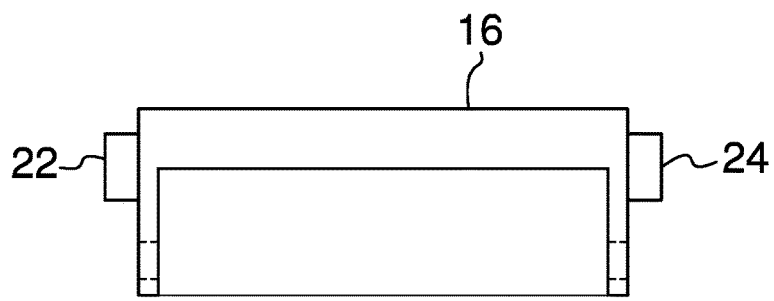
FIG. 2 is a back view of a cap an embodiment of the disclosure.
Figure 3:
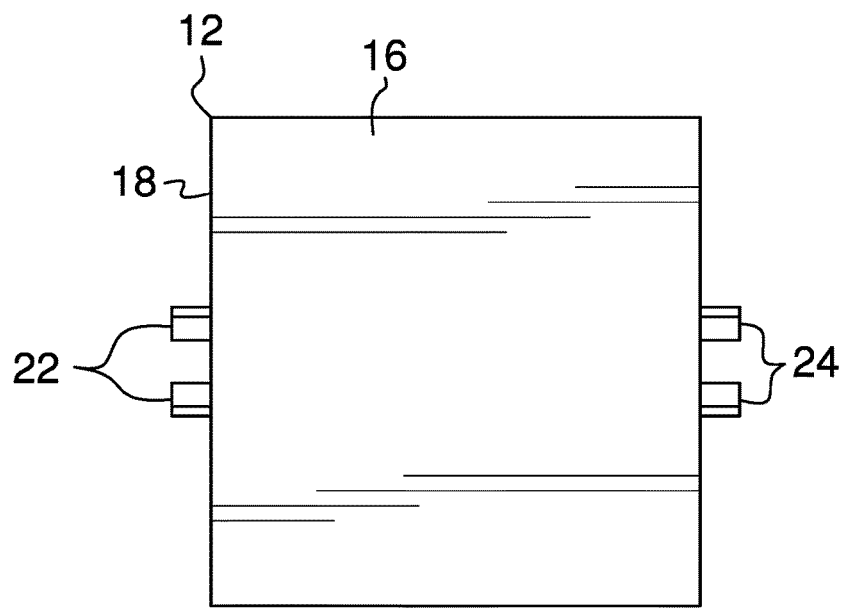
FIG. 3 is a top view of a cap of an embodiment of the disclosure.
Figure 4:
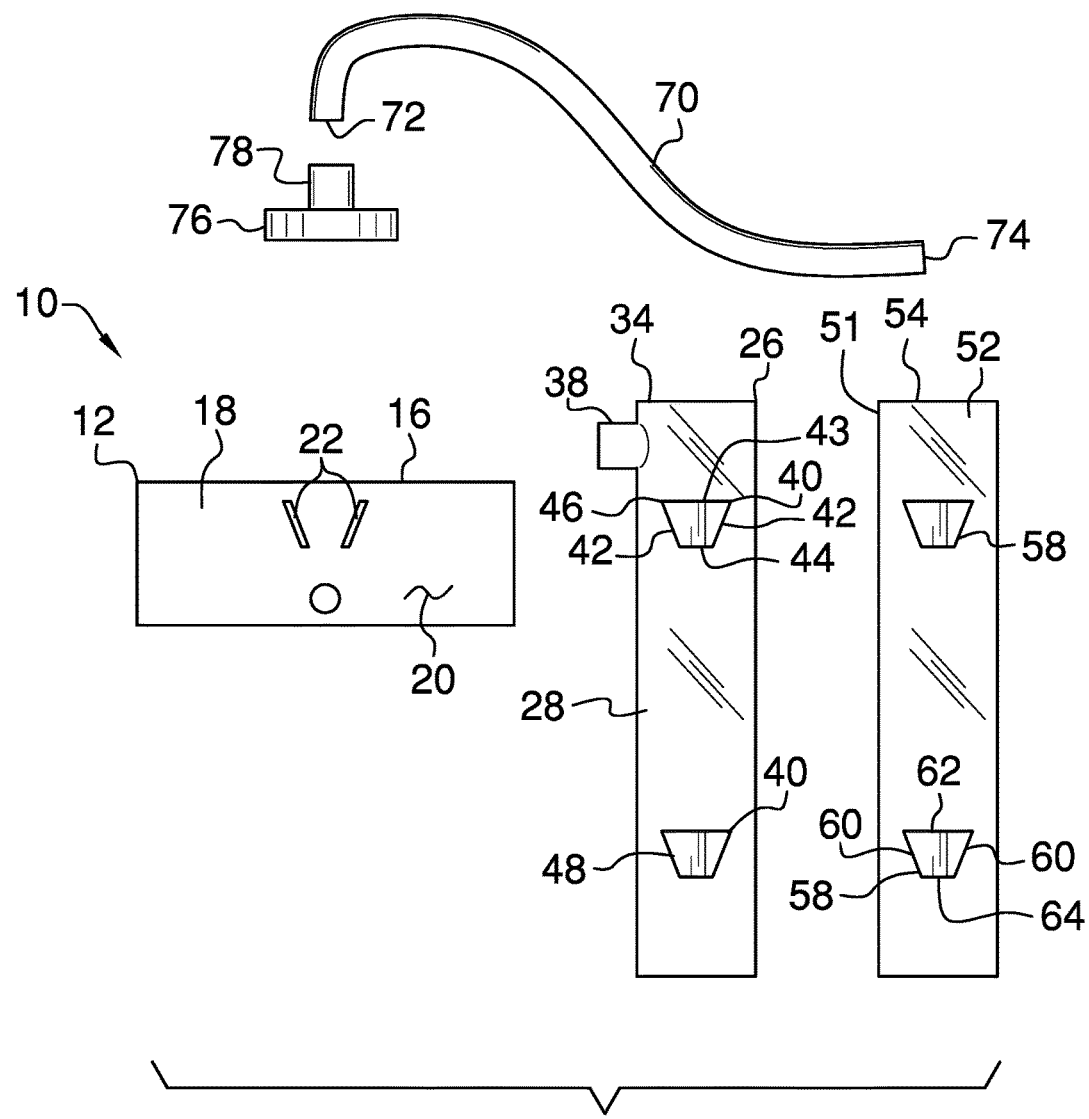
FIG. 4 is a right side perspective view of an embodiment of the disclosure.
Figure 5:
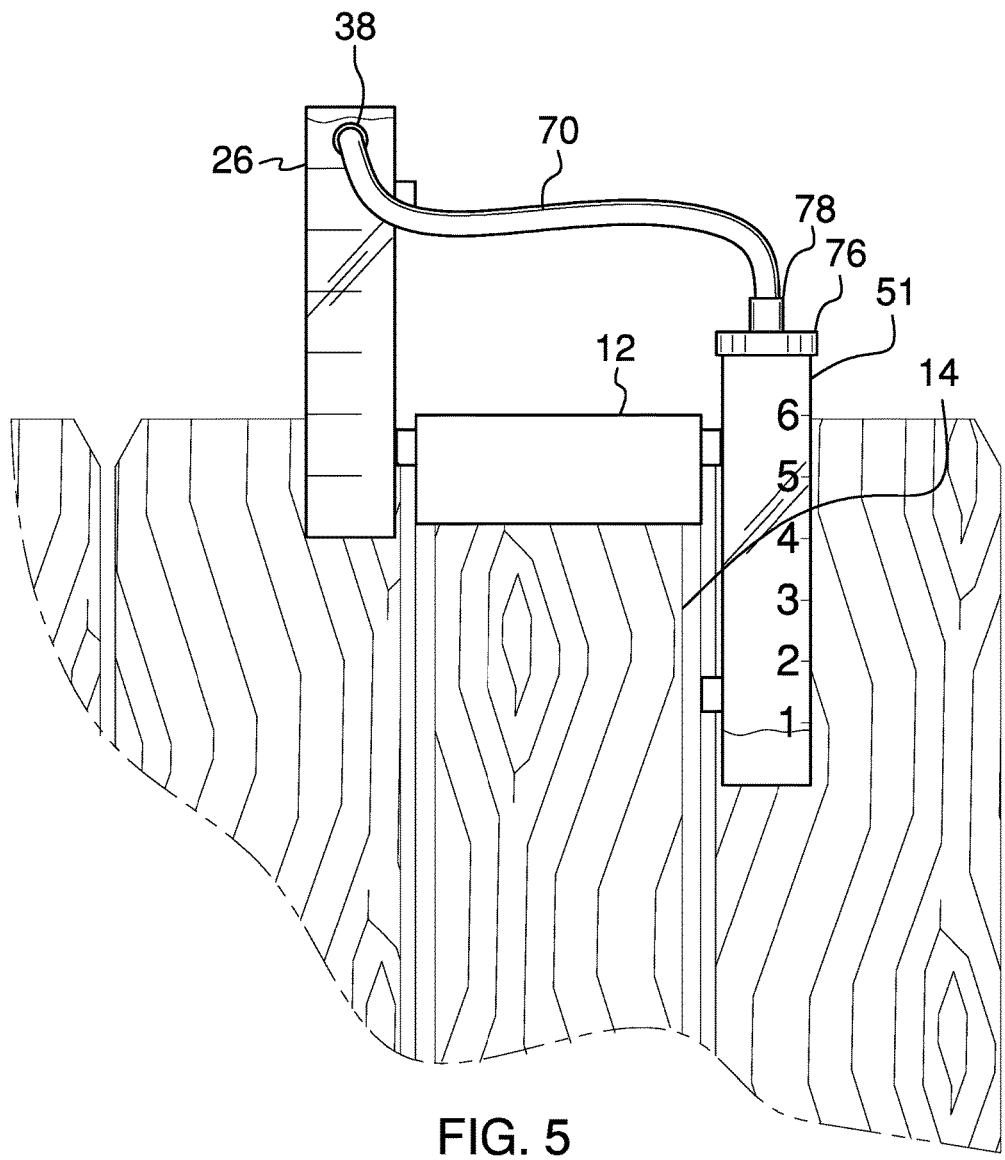
FIG. 5 is a perspective in-use view of an embodiment of the disclosure.
Figure 6:
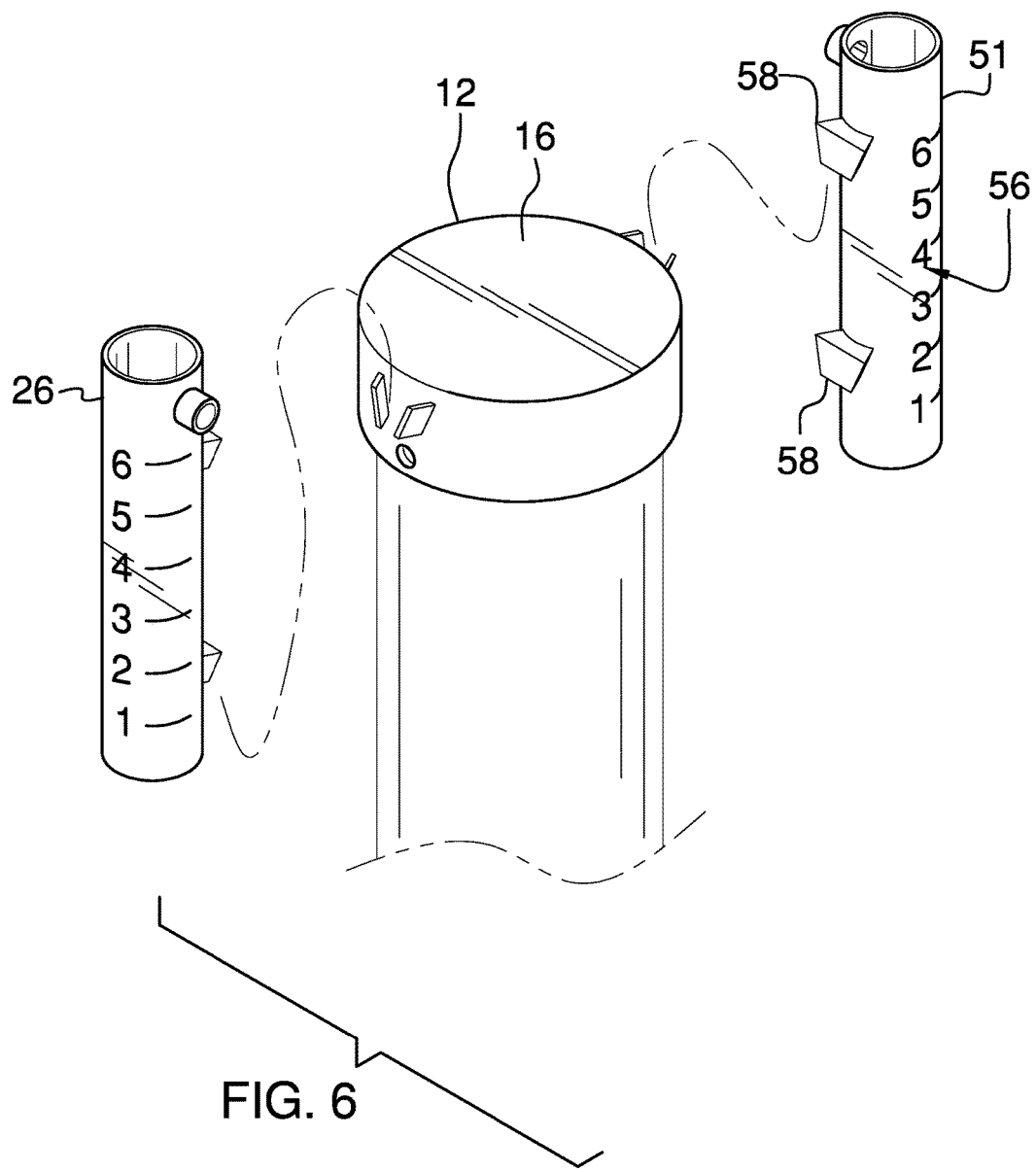
FIG. 6 is a perspective view of an embodiment of the disclosure.

With reference now to the drawings, and in particular to FIGS. 1 through 6 thereof, a new gauge device embodying the principles and concepts of an embodiment of the disclosure and generally designated by the reference numeral 10 will be described.

As best illustrated in FIGS. 1 through 6, the rain gauge assembly 10 generally comprises a cap 12 that is positioned on a stanchion 14, such as a fence post or the like. The cap 12 has a top wall 16 and a peripheral wall 18 extending downwardly therefrom and the peripheral wall 18 has an outer surface 20. The peripheral wall 18 may have a plurality of intersecting sides such that the cap 12 has a square shape. Moreover, the peripheral wall 18 may be continuous such that the cap 12 has a circular shape. The cap 12 may be secured to the stanchion 14 with screws, bolts and any other selected fastener.

A set of first tabs 22 is provided and each of the first tabs 22 is coupled to and extends outwardly from the outer surface 20. The first tabs 22 are positioned at an angle with respect to each other such that the first tabs 22 form a V shape. A set of second tabs 24 is provided and each of the second tabs 24 is coupled to and extends outwardly from the outer surface 20. The second tabs 24 are positioned at an angle with respect to each other such that the second tabs 24 form a V shape. The second tabs 24 are positioned on an opposite side of the peripheral wall 18 with respect to the first tabs 22.

A first container 26 is removably coupled to the cap 12 to capture rain for measuring rain fall. The first container 26 has an outer wall 28 and a top end 34 and the top end 34 is open. The first container 26 is comprised of a translucent material and indicia 36 are printed on the outer wall 28. The indicia 36 comprise a ruler for measuring the rain fall. A drain 38 extends outwardly from the outer wall 28 to drain the rain from the first container 26 and the drain 38 is positioned proximate the top end 34. In this way the drain 38 functions as an overflow.

A pair of first couplers 40 is each coupled to and extends outwardly from the outer wall 28 of the first container 26. Each of the first couplers 40 has a pair of lateral surfaces 42, a top surface 43 and a bottom surface 44. The lateral surfaces 42 on each of the first couplers 40 slopes inwardly between the top 43 and bottom 44 surfaces. Moreover, the pair of first couplers 40 includes an upper coupler 46 and a lower coupler 48. Each of the lateral surfaces 42 of the lower coupler 48 coextensively engages selected ones of the first 22 and second 24 tabs such that the first container 26 is removably retained on the cap 12.

A second container 51 is removably coupled to the cap 12 to capture rain for measuring rain fall. The second container 51 has an outer wall 52 and a top end 54 and the top end 54 is open. The second container 51 is comprised of a translucent material and indicia 56 are printed on the outer wall 52 of the second container 51. The indicia 56 corresponding to the second container 51 comprise a ruler for measuring the rain fall.

A pair of second couplers 58 is each coupled to and extends outwardly from the outer wall 28 of the second container 51. Each of the second couplers 58 has a pair of lateral surfaces 60, a top surface 62 and a bottom surface 64. The lateral surfaces 60 on each of the second couplers 58 slopes inwardly between the top 62 and bottom 64 surfaces. Additionally, the pair of second couplers 58 includes a top coupler 66 and a bottom coupler 68. Each of the lateral surfaces 42 of the top coupler 66 coextensively engages selected ones of the first 22 and second 24 tabs. In this way the second container 51 is removably retained on the cap 12 having the second container 51 being positioned lower than the first container 26.

A tube 70 is selectively and fluidly coupled between the first 26 and second 50 containers to direct the rain from the first container 26 into the second container 51 when the first container 26 is filled. The tube 70 has a first end 72 and a second end 74 and the first end 72 is fluidly coupled to the drain 38 on the first container 26. A cap 76 is removably coupled to the second container 51 and the cap 76 has a nipple 78 thereon. The nipple 78 is in fluid communication with an interior of the second container 51 when the cap 12 is positioned on the second container 51. The second end 74 of the tube 70 is fluidly coupled to the nipple 78 to direct the rain from the tube 70 into the first container 26.

In use, the cap 12 is positioned on the stanchion 14 and the cap 12 is coupled to the stanchion 14 with a selected fastener. The lower coupler 48 on the first container 26 is positioned between each of the set of first tabs 22. Thus, the first container 26 is removably retained on the stanchion 14 for measuring rain fall. The top coupler 66 on the second container 51 is positioned between each of the set of second tabs 24. In this way the second container 51s is removably retained on the stanchion 14. The cap 12 is positioned on the second container 51 and the tube 70 is fluidly coupled between the drain 38 and the nipple 78. In this way the second container 51 captures rain that overflows from the first container 26. Thus, the first 26 and second 50 containers facilitate total rain fall over an extended duration of time to be measured. Each of the first 26 and second 50 containers is selectively removed from the cap 12 for emptying.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rain gauge assembly being configured to be removably coupled to a stanchion thereby facilitating said assembly to capture rain, said assembly comprising:
   a cap being configured to be positioned on a stanchion;
   a first container being removably coupled to said cap wherein said first container is configured to capture rain for measuring rain fall;
   a second container being removably coupled to said cap wherein said second container is configured to capture rain for measuring rain fall; and
   a tube being selectively and fluidly coupled between said first and second containers wherein said tube is configured direct the rain from said first container into said second container when said first container is filled.

2. The assembly according to claim 1, wherein said cap has a top wall and a peripheral wall extending downwardly therefrom, said peripheral wall having an outer surface.

3. The assembly according to claim 2, further comprising a set of first of tabs, each of said first tabs being coupled to and extending outwardly from said outer surface, said first tabs being positioned at an angle with respect to each other such that said first tabs forms a V shape.

4. The assembly according to claim 2, further comprising a set of second of tabs, each of said second tabs being coupled to and extending outwardly from said outer surface, said second tabs being positioned at an angle with respect to each other such that said second tabs forms a V shape.

5. The assembly according to claim 1, wherein said first container has an outer wall and a top end, said top end being open, said first container being comprised of a translucent material, said outer wall having indicia being printed thereon, said indicia comprising a ruler for measuring the rain fall.

6. The assembly according to claim 5, wherein said outer wall has a drain extending outwardly therefrom wherein said drain is configured to drain the rain, said drain being positioned proximate said top end.

7. The assembly according to claim 5, further comprising a pair of first couplers, each of said first couplers being coupled to and extending outwardly from said outer wall of said first container, each of said first couplers having an pair of lateral surfaces, a top surface and a bottom surface, said lateral surfaces on each of said first couplers sloping inwardly between said top and bottom surfaces.

8. The assembly according to claim 7, wherein:
   said cap has a set of first tabs and a set of second tabs; and
   said pair of first couplers includes an upper coupler and a lower coupler, each of said lateral surfaces of said lower coupler coextensively engaging selected ones of said first and second tabs such that said first container is removably retained on said cap.

9. The assembly according to claim 1, wherein said second container has an outer wall and a top end, said top end being open, said second container being comprised of a translucent material, said outer wall of said second container having indicia being printed thereon, said indicia corresponding to said second container comprising a ruler for measuring the rain fall.

10. The assembly according to claim 9, further comprising a pair of second couplers, each of said second couplers being coupled to and extending outwardly from said outer wall of said second container, each of said second couplers having an pair of lateral surfaces, a top surface and a bottom surface, said lateral surfaces on each of said second couplers sloping inwardly between said top and bottom surfaces, said pair of second couplers including a top coupler and a bottom coupler.

11. The assembly according to claim 10, wherein:
said cap has a set of first tabs and a set of second tabs; and
each of said lateral surfaces of said top coupler coextensively engages selected ones of said first and second tabs such that said second container is removably retained on said cap having said second container being positioned lower than said first container.

12. The assembly according to claim 6, wherein said tube has a first end and a second end, said first end being fluidly coupled to said drain on said first container.

13. The assembly according to claim 12, further comprising a cap being removably coupled to said second container, said cap having a nipple thereon, said nipple being in fluid communication with an interior of said second container when said cap is positioned on said second container, said second end of said tube being fluidly coupled to said nipple wherein said nipple is configured to direct the rain from said tube into said first container.

14. A rain gauge assembly being configured to be removably coupled to a stanchion thereby facilitating said assembly to capture rain, said assembly comprising:
- a cap being configured to be positioned on a stanchion, said cap having a top wall and a peripheral wall extending downwardly therefrom, said peripheral wall having an outer surface;
- a set of first of tabs, each of said first tabs being coupled to and extending outwardly from said outer surface, said first tabs being positioned at an angle with respect to each other such that said first tabs forms a V shape;
- a set of second of tabs, each of said second tabs being coupled to and extending outwardly from said outer surface, said second tabs being positioned at an angle with respect to each other such that said second tabs forms a V shape;
- a first container being removably coupled to said cap wherein said first container is configured to capture rain for measuring rain fall, said first container having an outer wall and a top end, said top end being open, said first container being comprised of a translucent material, said outer wall having indicia being printed thereon, said indicia comprising a ruler for measuring the rain fall, said outer wall having a drain extending outwardly therefrom wherein said drain is configured to drain the rain, said drain being positioned proximate said top end;
- a pair of first couplers, each of said first couplers being coupled to and extending outwardly from said outer wall of said first container, each of said first couplers having an pair of lateral surfaces, a top surface and a bottom surface, said lateral surfaces on each of said first couplers sloping inwardly between said top and bottom surfaces, said pair of first couplers including an upper coupler and a lower coupler, each of said lateral surfaces of said lower coupler coextensively engaging selected ones of said first and second tabs such that said first container is removably retained on said cap;
- a second container being removably coupled to said cap wherein said second container is configured to capture rain for measuring rain fall, said second container having an outer wall and a top end, said top end being open, said second container being comprised of a translucent material, said outer wall of said second container having indicia being printed thereon, said indicia corresponding to said second container comprising a ruler for measuring the rain fall;
- a pair of second couplers, each of said second couplers being coupled to and extending outwardly from said outer wall of said second container, each of said second couplers having an pair of lateral surfaces, a top surface and a bottom surface, said lateral surfaces on each of said second couplers sloping inwardly between said top and bottom surfaces, said pair of second couplers including a top coupler and a bottom coupler, each of said lateral surfaces of said top coupler coextensively engaging selected ones of said first and second tabs such that said second container is removably retained on said cap having said second container being positioned lower than said first container;
- a tube being selectively and fluidly coupled between said first and second containers wherein said tube is configured direct the rain from said first container into said second container when said first container is filled, said tube having a first end and a second end, said first end being fluidly coupled to said drain on said first container; and
- a cap being removably coupled to said second container, said cap having a nipple thereon, said nipple being in fluid communication with an interior of said second container when said cap is positioned on said second container, said second end of said tube being fluidly coupled to said nipple wherein said nipple is configured to direct the rain from said tube into said first container.

* * * * *